United States Patent Office 2,799,671
Patented July 16, 1957

2,799,671
MONOAZO DYESTUFFS

Raymond Gunst, Binningen, Switzerland, assignor to Ciba Limited, Basel, Switzerland, a Swiss firm No Drawing. Application July 21, 1955,
Serial No. 523,633

Claims priority, application Switzerland July 23, 1954

9 Claims. (Cl. 260—157)

This invention provides new monoazo-dyestuffs which like, for example, the dyestuff of the formula (1)
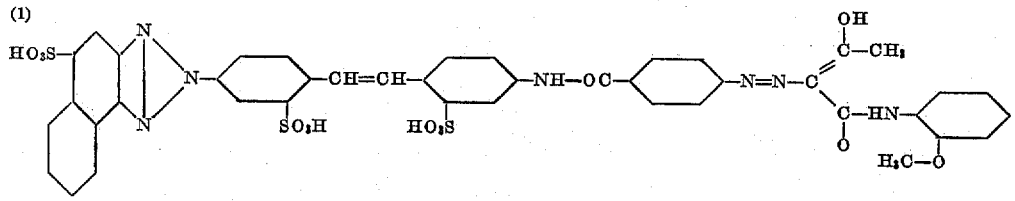

correspond to the general formula (2)
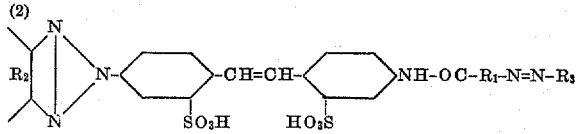

in which $R_1$ represents a benzene radical, $R_2$ represents a naphthalene radical fused on the triazole ring in the 1:2-positions as indicated by the valence bonds, and $R_3$ represents the radical of an acetoacetylamino-benzene free from groups imparting solubility in water, and in which the groups —NH—CO— and —N=N— are in para-position to one another.

The invention also provides a process for the manufacture of monoazo-dyestuffs of the above Formula 2, wherein a diazo-compound of an amine of the formula (3)
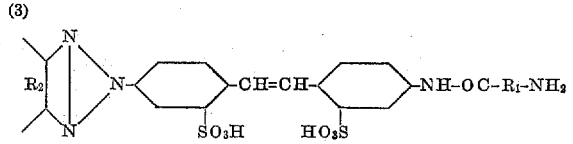

in which $R_1$ represents a benzene radical, and $R_2$ represents a naphthalene radical fused on to the triazole ring in the 1:2-positions as indicated by the valence bonds, and in which the —NH$_2$ group is in para-position relatively to the —NH—CO— group, is coupled with an acetoacetylamino-benzene free from groups imparting solubility in water.

The amines of the Formula 3 can be prepared by acylating an amine of the formula (4)
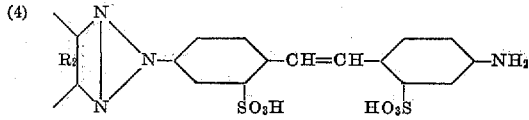

in which $R_1$ and $R_2$ have the meanings given above, with an acylating agent capable of introducing the radical —OC—$R_1$—O$_2$, and reducing the nitro group. The amines of the Formula 4 are advantageously prepared by coupling a diazotized 4-nitro-4'-aminostilbene-2:2'-disulfonic acid with an aminonaphthalene capable of coupling in a position vicinal to the amino group, oxidizing the ortho-amino-azo-grouping in the azo-dyestuff so obtained to the triazole ring, and finally reducing to an amino group the nitro group in the 4-position of the stilbene-triazole so obtained. As aminonaphthalenes there may be used, for example, aminonaphthalene disulfonic acids or especially aminonaphthalene monosulfonic acids. The compounds of the Formula 4 obtainable from these coupling components in the manner described contain as the radical

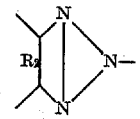

a radical of the constitution $$C_{10}H_4N_3H_{2-n}(SO_3H)_n$$

in which $n$ represents the whole number 1 or 2. As coupling components there may be mentioned: 1-amino-naphthalene-4- or -5-sulfonic acid, 2-aminonaphthalene-6- or -7-sulfonic acid, 1-aminonaphthalene-5:7-disulfonic acid, and 2-aminonaphthalene-3:5- or -3:6- or -5:7-disulfonic acid.

The reactions referred to above can be carried out by methods in themselves known. Coupling with the aminonaphthalene sulfonic acids is advantageously carried out in an acid medium. Copper-tetramine solutions are generally well suited for the oxidation to form the triazole ring. In the case of amino-azo-compounds of which the naphthalene radical contains the amino group in a $\beta$-position and is bound in the vicinal $\alpha$-position to the azo-linkage, oxidation with an alkali hypochlorite is also quite suitable.

As acylating agents capable of introducing the residue —OC—$R_1$—NO$_2$ and with which the amines of the Formula 4 are to be acylated, there may be used, for example, benzoyl chlorides, which contain a nitro group in para-position to the carboxylic acid chloride group and may also contain further substituents, for example, alkyl groups of low molecular weight. There may be mentioned, for example, 4-nitrobenzoyl chloride, 3-methyl-4-nitrobenzoyl chloride and 3-chloro-4-nitrobenzoyl chloride.

As coupling components there are used in the present process acetoacetylamino-benzenes free from groups imparting solubility in water. In these compounds the benzene nucleus bound to the —NH— group advantageously contains at least one further substituent. As substituents there may be mentioned, for example, alkyl or alkoxy groups of low molecular weight, such as methyl, ethyl, methoxy or ethoxy groups, halogen atoms such as bromine or chlorine, and acetylamino groups. Especially good results are generally obtained with acetoacetylamino-benzenes which contain in ortho-position to the —NH— group an alkoxy group of low molecular weight, for example, an ethoxy or especially a methoxy group. As examples of coupling components there may be mentioned:

Acetoacetylamino-benzene,
1-acetoacetylamino-2-chlorobenzene,
1-acetoacetylamino-2-methoxybenzene,
1-acetoacetylamino-4-methoxybenzene,
1-acetoacetylamino-2-methoxy-5-methylbenzene,
1-acetoacetylamino-2:4-dimethylbenzene,
1-acetoacetylamino-2:5-dimethoxybenzene,
1 - acetoacetylamino - 2 - methoxy - 4 - chloro - 5 - methylbenzene,
1-acetoacetylamino-2-ethoxy-4-chloro - 5 - methylbenzene,
1-acetoacetylamino-2-methoxy-4-bromo - 5 - methylbenzene,
1-acetoacetylamino-2-ethoxy - 4 - bromo - 5 - methylbenzene, and
1 - acetoacetylamino - 5 - methoxy - 4 - acetylamino - 2 - chlorobenzene.

The diazotization of the amines of the Formula 3 is advantageously carried out by the so-called indirect method, that is to say, by mixing with an excess of hydrochloric acid a solution of an alkali salt of the diazo-component containing a slight excess of alkali and the necessary quantity of alkali metal nitrite. The coupling may be carried out in a weakly acid or neutral medium or a medium rendered alkaline, for example, with an alkali metal bicarbonate or alkali metal carbonate.

The new monoazo-dyestuffs of the Formula 2 are suitable for printing and especially for dyeing a very wide variety of materials, for example, those of animal origin, such as wool, silk and leather, but especially cellulose-containing fibers such as cotton, linen or artificial silk or staple fibers of regenerated cellulose. They yield very pure, so-called greenish yellow tints, possess a very good affinity for cellulose fibers, and yield dyeings having properties of fastness which excell those of the known dyestuffs of comparable constitution and yielding greenish yellow dyeings.

The advantages mentioned above apply, more especially, with respect to the dyestuffs described in German Patents Nos. 293,333 and 470,652 and British Patent No. 659,130. These known dyestuffs, of which some have attained considerable practical importance, are prepared by coupling diazotized 2-(aminophenyl)-benthiazoledisulfonic acids with acetoacetylaminobenzenes, by coupling diazotized 2-(aminophenyl)-benzthiazole monosulfonic acids with acetoacetylamino-benzene sulfonic acids or by sulfonating monoazo-dyestuffs obtained from diazotized 2-(aminophenyl)-benzthiazole monosulfonic acids and acetoacetylamino-benzenes. On cellulose fibers these dyestuffs likewise yield pure greenish yellow tints. Owing to this property they have found industrial application, notwithstanding that their affinity and properties of wet fastness, even in the case of the dyestuffs of the latest of the three specifications mentioned above, only satisfy very moderate requirements. As compared with these known products, the new dyestuffs of this invention are distinguished by their better affinity, better properties of wet fastness and in some cases by their better fastness to light.

The following examples illustrate the invention, the parts and percentages being by weight:

*Example 1*

602 parts of 4-amino-4'-(1":2"-naphthotriazole-stilbene)-2:2':4"-trisulfonic acid of the formula

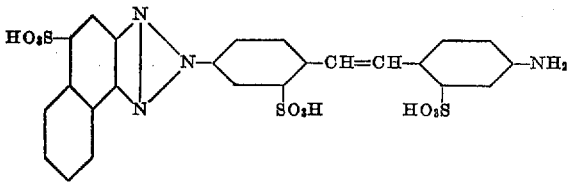

(prepared, for example, in the manner described in German Patent No. 695,404) are dissolved in 500 parts of water with the addition of 130 parts of sodium hydroxide solution of 30 percent strength. The reaction must be weakly alkaline to Brilliant Yellow paper. A solution of 200 parts of 4-nitrobenzoyl chloride in 200 parts of acetone is run in a fine stream into the weakly alkaline solution at 45° C., while stirring vigorously. In order to complete the condensation, the reaction mixture is heated at 70° C. for a further hour. In order to form the amino-compound reduction is carried out in known manner, either with iron and acetic acid or in alkaline solution with sodium sulfide or sodium hydrosulfide.

72.1 parts of the 4-aminobenzoylated triazole-stilbene so obtained are dissolved in the form of the sodium salt in 300 parts of hot water. 7 parts of sodium nitrite are added in the form of a concentrated aqueous solution, the mixture is run in the form of a fine stream, while stirring vigorously, into 30 parts by volume of hydrochloric acid of 30 percent strength, and the temperature is maintained at 20° C. by the addition of ice. After 3 hours the diazo-suspension is filtered, again stirred in water, and run at room temperature while stirring well, into a solution of 21 parts of 1-acetoacetylamino-2-methoxybenzene, 13.5 parts of sodium hydroxide solution of 30 percent strength and 30 parts of sodium carbonate in 300 parts of water. By the addition of 10 parts of sodium chloride for every 100 parts by volume of coupling mixture the dyestuff formed is completely precipitated, and then filtered off. It forms a yellow powder, which dissolves in water with a yellow coloration. It dyes cellulose fibers very clear greenish yellow tints, which are distinguished by their good properties of wet fastness and good fastness to light.

*Example 2*

72.1 parts of the diazo-component used in Example 1 are diazotized in the manner described therein. For the purpose of coupling, 27.2 parts of 1-acetoacetylamino-2:5-dimethoxy-4-chlorobenzene are dissolved in 250 parts of water with the addition of 13.5 parts of sodium hydroxide solution of 30 percent strength and 20 parts of crystalline sodium acetate. The diazo-suspension is run at room temperature, while stirring well, into the solution of the coupling component. After stirring the mixture for about one hour, there is slowly added dropwise an aqueous solution of 10 percent strength of sodium carbonate until the reaction mixture has a weakly alkaline reaction to Brilliant Yellow paper. The whole is then heated to 30° C. and stirred for about 2 hours longer. The dyestuff formed is completely precipitated by the addition of sodium chloride, filtered off and dried. It forms a yellow powder, which dissolves in water with a yellow coloration. It dyes cellulose fibers very clear greenish yellow tints, which are distinguished more especially by their good properties of wet fastness and good fastness to light.

*Example 3*

The diazo-suspension of 72.1 parts of the 4-aminobenzoylated triazole-stilbene used in the preceding examples is mixed, while stirring vigorously, with a weakly acetic acid suspension of 30 parts of 1-aceto-acetylamino-4-acetylamino-5-methoxy-2 - chlorobenzene, which is prepared as follows: 30 parts of 1-acetoacetylamino-4-acetylamino-5-methoxy-2-chlorobenzene are dissolved in 400 parts of water with the addition of 13.5 parts of sodium hydroxide solution of 30 percent strength. By adding acetic acid dropwise, while stirring very vigorously, until the reaction is distinctly acid to litmus the acetoacetyl-arylide is precipitated in a very fine reactive form. After mixing the suspension of the coupling component with the diazo-suspension, the temperature of the reaction mixture is raised in the course of one hour to 40–50° C., while stirring vigorously, and then the mixture is maintained at that temperature for 4 hours. In order to precipitate the dyestuff formed, the mixture is given an alkaline reaction to Brilliant Yellow paper by introducing dropwise an aqueous solution of sodium carbonate and a small amount of sodium chloride is then added, after which the precipitated dyestuff is filtered off. The new dyestuff forms a yellow powder, which dissolves in water with a yellow coloration and dyes cellulose fibres very clear greenish yellow tints, which are distinguished by their very good properties of wet fastness and fastness to light.

In the following table are given further dyestuffs which can be obtained in the same manner and which possess similar properties to the dyestuffs of the preceding example. They dye cellulose fibers greenish yellow tints, and the dyeings are distinguished, more especially, by their good properties of wet fastness.

| | Diazo components | | Coupling Components |
|---|---|---|---|
| | $R_2$–[triazine]–N–[phenyl(SO$_3$H)]–CH=CH–[phenyl(HO$_3$S)]–NH–OC–$R_1$–NH$_2$ | | H$_2$C–OC–H$_2$C–OC–HN–$R_3$ |
| | Radical $R_2$–[triazine]–N– | Radical –OC–$R_1$–NH$_2$ | Radical –HN–$R_3$ |
| 1 | HO$_3$S–[naphthotriazine]–N– | –OC–[phenyl]–NH$_2$ | –HN–[phenyl(OCH$_3$, Cl, H$_3$CO)] |
| 2 | HO$_3$S–[naphthotriazine(SO$_3$H)]–N– | –OC–[phenyl]–NH$_2$ | –HN–[phenyl(H$_3$CO)] |
| 3 | HO$_3$S–[naphthotriazine(SO$_3$H)]–N– | –OC–[phenyl]–NH$_2$ | –H–[phenyl(OCH$_3$, Cl, H$_3$CO)] |
| 4 | HO$_3$S–[naphthotriazine]–N– | –OC–[phenyl(CH$_3$)]–NH$_2$ | –NH–[phenyl(H$_3$CO)] |

Example 4

100 parts of cotton are entered at 50° C. into a dyebath which contains, in 3000 parts of water, 1 part of the dyestuff obtained as described in the first paragraph of Example 3, and 2 parts of anhydrous sodium carbonate, the temperature of the bath is raised in the course of ½ hour to 90° C., and 30 parts of crystalline sodium sulfate are added. Dyeing is then carried on for one hour at 90–95° C., and there is obtained a pure greenish yellow dyeing of good fastness to light and having good properties of wet fastness.

What is claimed is:

1. A monoazo dyestuff of the formula

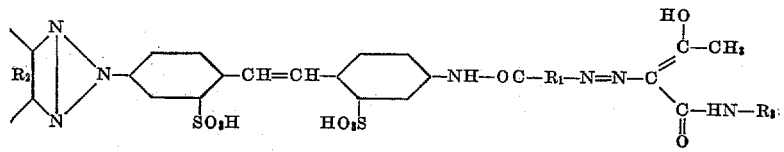

in which $R_1$ and $R_3$ each represents a benzene radical, $R_2$ represents a naphthalene radical fused on to the triazole ring in the 1:2-positions as indicated by the valence bonds, $R_1$ and $R_3$ are free from groups imparting solubility in water, and in which the —NH—OC— group is bound to $R_1$ in para-position with respect to the —N=N— group.

2. A monoazo dyestuff of the formula

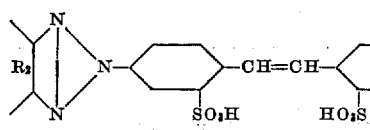

in which $R_1$ and $R_3$ each represents an aromatic radical containing one ring which is a carbocyclic ring, the radical

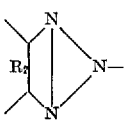

is a 1:2-naphthotriazole radical of the composition $C_{10}H_4N_3H_{2-n}(SO_3H)_n$ wherein $n$ represents a whole number of at the most 2, $R_1$ and $R_3$ are free from water-solubilizing groups and the —NH—OC— group is bound to $R_1$ in para-position with respect to the —N=N— group.

3. A monazo dyestuff of the formula

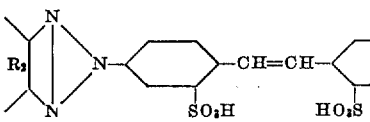

in which $R_1$ and $R_3$ each represents an aromatic radical containing one ring which is a carbocyclic ring, the radical

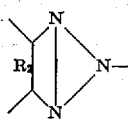

is a 1:2-naphthotriazole radical of the composition

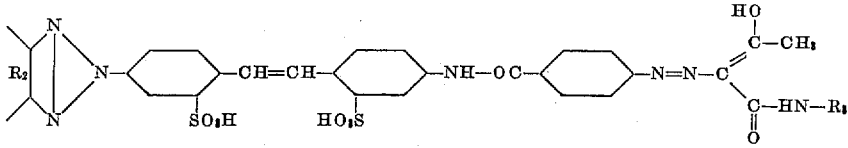

$C_{10}H_4N_3H_{2-n}(SO_3H)_n$ wherein $n$ represents a whole number of at the most 2, $R_1$ and $R_3$ are free from water-solubilizing groups and the —NH—OC— group is bound to $R_1$ in para-position with respect to the —N=N— group, and the radical $R_3$ contains a methoxy group.

4. A monoazo dyestuff of the formula

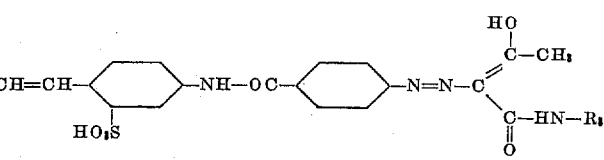

in which $R_3$ represents an aromatic radical containing one ring, which is a carbocyclic ring, and containing a methoxy group in ortho position to the —HN— group, but being free from water-solubilizing groups, and the radical

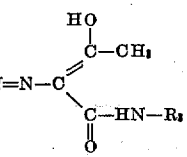

is a 1:2-naphthotriazole radical of the composition $C_{10}H_4N_3H_{2-n}(SO_3H)_n$ wherein $n$ represents a whole number of at the most 2.

5. The monoazo dyestuff of the formula

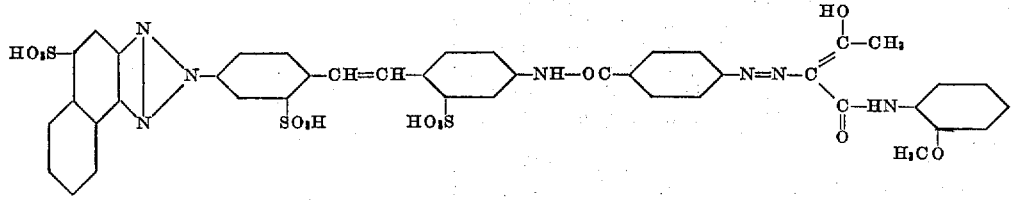

6. The monoazo dyestuff of the formula

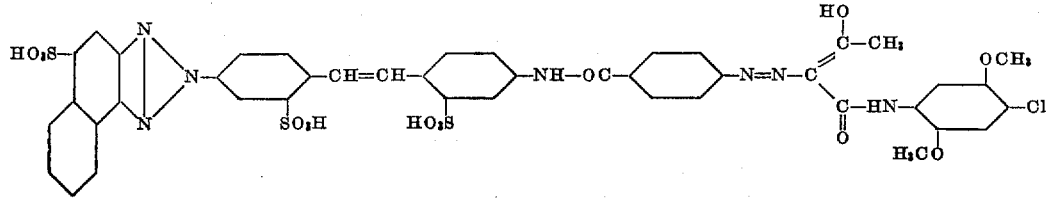

7. The monoazo dyestuff of the formula
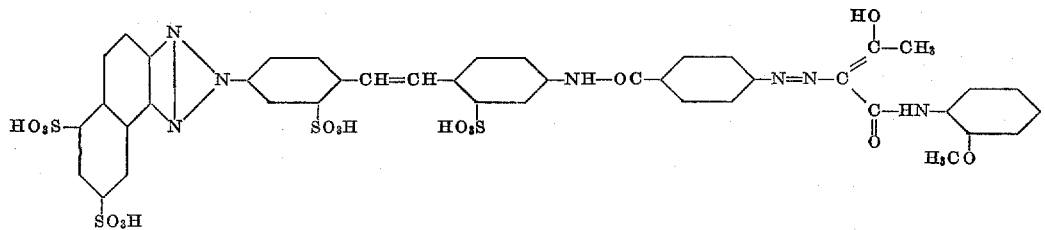
8. The monoazo dyestuff of the formula
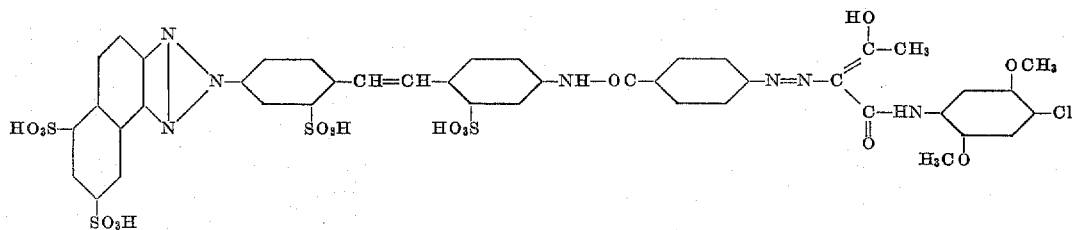
9. The monoazo dyestuff of the formula
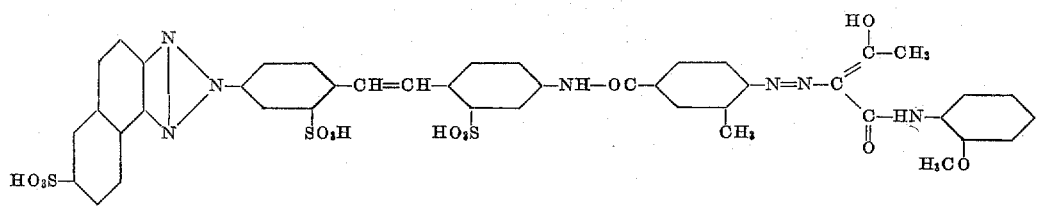
References Cited in the file of this patent
UNITED STATES PATENTS
| | | |
|---|---|---|
| 2,385,862 | Keller | Oct. 2, 1945 |
| 2,467,262 | Knight | Apr. 12, 1949 |

UNITED STATES PATENT OFFICE
Certificate of Correction

Patent No. 2,799,671                           July 16, 1957

Raymond Gunst

It is hereby certified that error appears in the printed specification of the above numbered patent requiring correction and that the said Letters Patent should read as corrected below.

Columns 1 and 2, formula (1), right-hand portion thereof should appear as shown below instead of as in the patent—

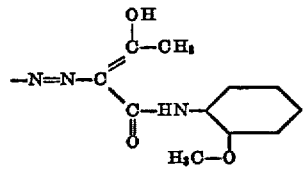

Signed and sealed this 19th day of November 1957.

[SEAL]

Attest:
KARL H. AXLINE,
*Attesting Officer.*

ROBERT C. WATSON,
*Commissioner of Patents.*